W. M. BEEMAN.
Register for Regulating Time Pieces.
No. 57,848. Patented Sept. 11, 1866.
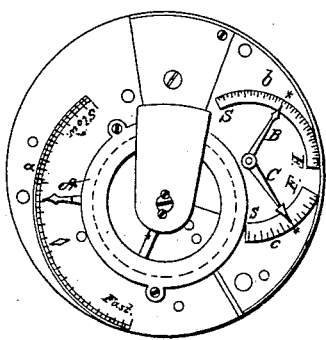
Witnesses:
Inventor:

UNITED STATES PATENT OFFICE.

WILLIAM M. BEEMAN, OF HARTFORD, CONNECTICUT.

IMPROVEMENT IN REGISTERS FOR REGULATING TIME-KEEPERS.

Specification forming part of Letters Patent No. 57,848, dated September 11, 1866.

*To all whom it may concern:*

Be it known that I, WM. M. BEEMAN, of Hartford, in the county of Hartford and State of Connecticut, have invented a new and Improved Regulating-Register for Time-Keepers; and I do hereby declare that the following is a full, clear, and exact description thereof, which will enable others skilled in the art to make and use the same, reference being had to the accompanying drawing, forming part of this specification.

This invention consists in the employment of two registering devices, in connection with the ordinary regulating-lever of a watch or other time-keeper, one register being used to record the deviation of the watch during twenty-four hours, or other given space of time, and the second register being to record the distance and direction which the regulator is moved the first time for correcting or obviating the said deviation, so that the regulation of time-keepers is, in this case, reduced to a simple calculation, and the correct point for setting the regulating-lever is readily found after the first set of observations, and the process is much simplified, and has important advantages over the rambling method by which the correct point for setting the regulating-lever has heretofore been found.

The drawing shows the back-plate of a watch with my regulating-registers applied thereto.

A $a$ are the ordinary regulating-lever and graduated scale. B $b$ are an index-hand and graduation, for recording the movements of the regulating-lever A; and C $c$ are a second index-hand and graduation for noting the deviation of the watch.

Its operation is as follows: The watch is run a given time, and its deviation, either fast or slow, is discovered, and then the extent of the deviation in time is registered by the index C, which is turned in one direction for fast and in the opposite direction for slow. Then the distance which the regulator A is moved is noted by the index B, and the watch is allowed to run a second space of given time equal to the first, and then the effect which the movement of the regulator has produced is observed, and when this effect is considered in connection with the noted deviation from the true time and the noted space which the regulator was moved, then the correct point for setting the regulator is pointed out by comparing the original deviation, the movement of the regulator, and the effect.

By this means the true point is arrived at with mathematical precision, and the regulating is done more readily than ordinarily.

Having thus described my invention, what I claim as new, and desire to secure by Letters Patent, is—

The registers B $b$ and C $c$, in connection with the regulator A $a$, substantially as and for the purpose herein specified.

The above specification of my invention signed by me this 16th day of June, 1866.

W. M. BEEMAN.

Witnesses:
WM. F. MCNAMARA,
ALEX. F. ROBERTS.